(12) United States Patent
Hwang et al.

(10) Patent No.: US 7,869,319 B2
(45) Date of Patent: Jan. 11, 2011

(54) OPTICAL RECORDING MEDIUM, RECORDING/REPRODUCING APPARATUS AND RECORDING/REPRODUCING METHOD

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/967,555

(22) Filed: Dec. 31, 2007

(65) Prior Publication Data

US 2008/0101189 A1    May 1, 2008

Related U.S. Application Data

(63) Continuation of application No. 11/028,207, filed on Jan. 4, 2005, now abandoned.

(30) Foreign Application Priority Data

| Jan. 5, 2004 | (KR) | .................................... 2004-372 |
| Feb. 14, 2004 | (KR) | ................................ 2004-9846 |

(51) Int. Cl.
*G11B 7/00* (2006.01)
*G11B 5/09* (2006.01)
(52) U.S. Cl. .............. 369/53.17; 369/47.14; 369/275.3; 369/94
(58) Field of Classification Search .................. None
See application file for complete search history.

(56) References Cited

U.S. PATENT DOCUMENTS

| 6,160,778 | A | 12/2000 | Ito et al. |
| 6,336,202 | B1 | 1/2002 | Tsuchimoto et al. |
| 6,385,148 | B2 | 5/2002 | Ito et al. |
| 6,526,522 | B1 | 2/2003 | Park et al. |
| 6,529,458 | B1 | 3/2003 | Shin |
| 6,571,309 | B2 | 5/2003 | Ando et al. |
| 6,671,243 | B2 | 12/2003 | Ando et al. |
| 7,123,556 | B2 | 10/2006 | Ueda et al. |
| 7,277,371 | B2 | 10/2007 | Terada et al. |

FOREIGN PATENT DOCUMENTS

| CN | 1338103 A | 2/2002 |
| EP | 1 152 414 A2 | 11/2001 |
| JP | 06-338140 | 12/1994 |

(Continued)

OTHER PUBLICATIONS

Office Action issued in Korean Patent Application No. 2004-9846 on Dec. 8, 2006.

(Continued)

*Primary Examiner*—Jorge L Ortiz Criado
(74) *Attorney, Agent, or Firm*—NSIP Law

(57) ABSTRACT

An optical recording medium including a user data area and an SA/DL area in which a replacement block to replace a defective block in the user data area, and information regarding a defect corresponding to the defective block, is recorded, wherein the information regarding the defect includes a consecutive defect list entry including information regarding defects located in consecutive locations of the user data area; an apparatus using the optical recording medium; and a method of using the optical recording medium.

15 Claims, 11 Drawing Sheets

FOREIGN PATENT DOCUMENTS

| | | |
|---|---|---|
| JP | 2000-040308 | 2/2000 |
| JP | 2000-228069 | 8/2000 |
| JP | 2000-322838 | 11/2000 |
| JP | 2001-176204 | 6/2001 |
| JP | 2002-25198 | 1/2002 |
| JP | 2003-323769 | 11/2003 |
| JP | 2004-280865 | 10/2004 |
| WO | WO 00/07185 | 2/2000 |

OTHER PUBLICATIONS

Office Action issued in Russian Patent Application No. 2006128599 on Oct. 25, 2007.
U.S. Appl. No. 11/028,207, filed Jan. 4, 2005, Sung-hee Hwang, et al., Samsung Electronics Co., Ltd.
U.S. Appl. No. 11/967,505, filed Dec. 31, 2007, Sung-hee Hwang, et al., Samsung Electronics Co., Ltd.
U.S. Appl. No. 11/967,581, filed Dec. 31, 2007, Sung-hee Hwang, et al., Samsung Electronics Co., Ltd.
Office Action and Search Report issued in corresponding Taiwanese Patent Application No. 091341305 dated Jun. 24, 2008.
Preliminary Notice of the First Office Action for Taiwanese Patent Application No. 93141305 dated Feb. 26, 2009.
Office Action dated Apr. 10, 2009 of the Chinese Patent Application No. 200710109064.5.
Canadian Office Action issued on Jan. 27, 2010, in corresponding Canadian Application No. 2,552,132 (3 pages).
International Search Report and Written Opinion of the International Searching Authority issued on Mar. 29, 2005, in counterpart International Application No. PCT/KR2004/003460 (6 pages).
Japanese Office Action issued on Jan. 19, 2010, in corresponding Japanese Application No. 2006-546834 (3 pages).

| REPLACEMENT STATE INFORMATION | CONSECUTIVE DEFECT INFORMATION |
|---|---|
| 0 | 0 0 |
| 1 | 0 0 |
| 0 | 0 1 |
| 0 | 1 0 |
| 1 | 0 1 |
| 1 | 1 0 |

FIG. 11C

| | | | | |
|---|---|---|---|---|
| DL IDENTIFIER | | | | — 410 |
| DL UPDATE COUNTER=K | | | | — 420 |
| NUMBER OF DL ENTRIES=5 | | | | — 430 |
| NUMBER OF CONSECUTIVE DL ENTRIES=2 | | | | — 490 |
| NUMBER OF CONSECUTIVE DEFECT ENTRIES HAVING REPLACEMENT STATE INFORMATION "0"=1 | | | | — 500 |
| NUMBER OF CONSECUTIVE DEFECT ENTRIES HAVING REPLACEMENT STATE INFORMATION "1"=1 | | | | — 510 |
| 0 | 00 | 5 | 55 | — 440 |
| 0 | 01 | 9 | 56 | — 450 |
| 0 | 10 | 12 | 59 | — 460 |
| 1 | 01 | 17 | 00 | — 470 |
| 1 | 10 | 20 | 00 | — 480 |

DL #K (400)

OPTICAL RECORDING MEDIUM, RECORDING/REPRODUCING APPARATUS AND RECORDING/REPRODUCING METHOD

CROSS-REFERENCE TO RELATED APPLICATIONS

This application is a continuation of application Ser. No. 11/028,207 filed on Jan. 4, 2005, now abandoned, which claims the benefit of Korean Patent Application Nos. 2004-372 filed on Jan. 5, 2004, and 2004-9846 filed on Feb. 14, 2004, in the Korean Intellectual Property Office, the disclosures of which are incorporated herein by reference in their entirety.

BACKGROUND OF THE INVENTION

1. Field of the Invention

The present invention relates to an optical recording medium, recording/reproducing apparatus and recording/reproducing method for defect management.

2. Description of the Related Art

Disc defect management is a process of compensating for data loss caused by a defect in a user data area of a disc, i.e., a defective block, by writing user data recorded in the defective block to a new portion of the user data area. Generally, disc defect management is performed using a linear replacement method or a slipping replacement method. In these methods, a defective area is replaced with a spare area having no defects. In the slipping replacement method, a defective area is slipped and a next non-defective area is used. In the linear replacement method, a block of a user data area in which a defect occurs is called a defective block. A replacement block for replacing a defective block is recorded in a spare area in a predetermined part of disc. Information on the defective block and the replacement block, i.e., information for searching the locations of the defective block and the replacement block, is presented in a defect list.

Generally, when a host reads data recorded on a disc, the host determines a logical address of the data and orders a hard disc drive to read the data. Then, the hard disc drive searches for a physical address corresponding to the logical address and reads the data recorded on the disc in a location corresponding to the physical address. If a defective block occurs in the data corresponding to the physical address, the hard disc drive has to find a replacement block that replaced the defective block. Therefore, a defect list includes defect list entries, each of the entries respectively containing information on each of the defective blocks. That is, a defect list entry is generated for each defective block, thus requiring a considerable recording space for the defect lists.

Therefore, effective management of a space for a defect list is required. For this, effective management of information on defective blocks is required, especially for defective blocks that occurred in consecutive locations of a user data area.

SUMMARY OF THE INVENTION

The present invention provides an optical disc on which defects are managed, and a defect management apparatus and method, which effectively manage a space required for a defect list for managing defects in a disc, and a computer-readable optical disc storing a computer program to control an apparatus to perform the defect management method.

Additional aspects and/or advantages of the invention will be set forth in part in the description which follows and, in part, will be obvious from the description, or may be learned by practice of the invention.

According to an aspect of the present invention, an optical recording medium on which defects are managed includes a replacement block replacing a defective block located in a user data area and an SA/DL area in which information regarding the defect is recorded. The information regarding the defect includes a consecutive defect list entry that includes information regarding defects located in consecutive locations of the user data area.

The consecutive defect list entry may comprise a start entry corresponding to information regarding a first defective block, and an end entry corresponding to information regarding a last defective block, wherein the first and last defective blocks are among defective blocks in the consecutive locations of the user data area.

The start entry may include location information regarding the first defective block, and location information regarding a replacement block replacing the first defective block.

The end entry may include location information regarding the last defective block, and location information regarding a replacement block replacing the last defective block.

The information on the defect may include information regarding a number of the consecutive defect list entries.

The information on the defect may further include information regarding a number of defect list entries.

The number of single defect list entries may be calculated by multiplying the number of consecutive defect list entries by a factor of two, and subtracting a resulting product from the number of defect list entries.

The information regarding the defect may include a defect list entry comprising location information regarding the defective block, location information regarding the replacement block, and state information regarding the defect.

The state information may include replacement state information showing whether the defective block is replaced, and consecutive defect information showing whether the defective block is a consecutive defective block.

The information regarding the defect may further include information regarding a number of consecutive defect list entries having replacement state information showing that the defective block is replaced.

The information regarding the defect may further include information regarding a number of consecutive defect list entries having replacement state information showing that the defective block is not replaced.

According to another aspect of the present invention, an apparatus to record/reproduce data on an optical recording medium comprises a writing/reading unit to write the data on the medium or read the data from the medium, and a controlling unit, wherein the controlling unit assigns to the medium an SA/DL area, in which a replacement block, which replaces a defective block having a defect in a user data area, and information regarding the defect is recorded, and controls the writing/reading unit to record the information regarding the defect, which comprises consecutive defect list entries corresponding to information regarding defects located in consecutive locations of the user data area, in the SA/DL area.

According to another aspect of the present invention, a method of recording/reproducing data on an optical recording medium comprises assigning to the medium an SA/DL area, in which a replacement block to replace a defective block in a user data area, and information regarding a defect corresponding to the defective block, is recorded, and recording information regarding the defect, which comprises consecutive defect list entries corresponding to information regarding defects located in consecutive locations of the user data area, in the SA/DL area.

According to another aspect of the present invention, there is provided a computer-readable optical disc storing a computer program to control an apparatus to perform a defect management method of recording/reproducing data on an optical disc on which defects are managed, the defect management method including assigning to the medium an SA/DL area, in which a replacement block to replace a defective block having a defect in a user data area, and information regarding the defect corresponding to the defective block is recorded, and recording information regarding the defect, which comprises consecutive defect list entries corresponding to information regarding defects located in consecutive locations of the user data area, in the SA/DL area.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 11C is a structural diagram of data of a DL #k illustrated in FIG. 11B, further including information on the number of consecutive defect list entries having replacement state information "0", and information on the number of consecutive defect list entries having replacement state information "1".

DETAILED DESCRIPTION OF THE PREFERRED EMBODIMENTS

Figure 1:
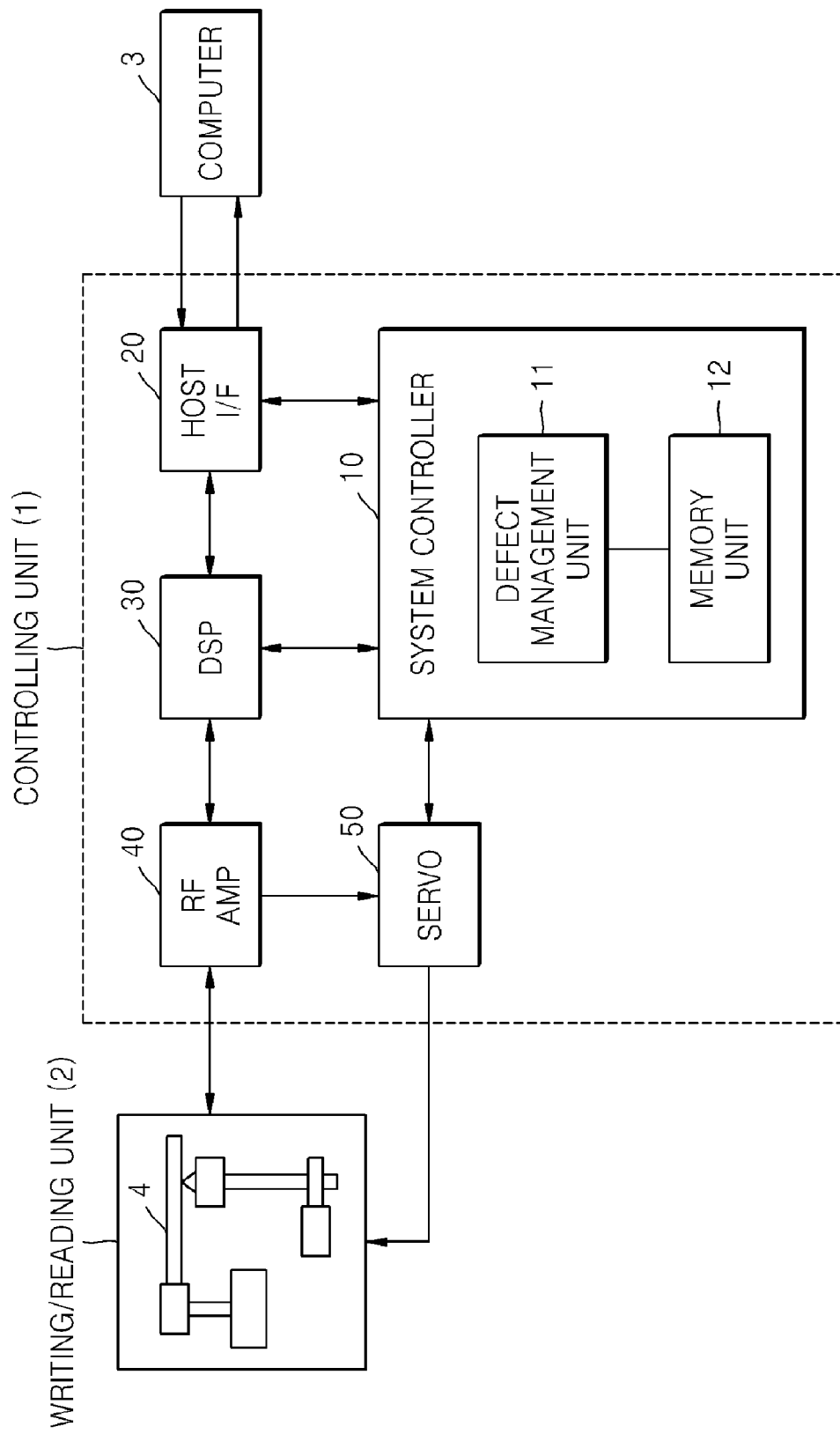
FIG. 1 is a block diagram of a data recording/reproducing device according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a data recording/reproducing device according to an embodiment of the present invention.

Referring to FIG. 1, the data recording/reproducing device includes a writing/reading unit 2 and a controlling unit 1.

The writing/reading unit 2 comprises a pickup and records/reads data on/from a disc 4 on which defects are managed according to the present invention. The controlling unit 1 performs defect management according to the present invention. In an embodiment of the present invention, the controlling unit 1 uses a verify-after-write method to find defective data by recording data by a predetermined unit and verifying the recorded data. The controlling unit 1 checks where the defective data occurs by writing and verifying user data by a recording operation unit. The controlling unit 1 generates defect information indicating where the defective data is located after checking the defective data, stores the generated information in a memory, and records the generated information on the disc as temporary defect information after collecting a predetermined amount of the generated information.

In an embodiment of the present invention, a recording operation, which is an operation determined by an intention of a user, or a desired recording operation, and the like, refers to an operation that includes loading the disc, recording data on the disc, and unloading the disc. During the recording operation, a verify-after-write operation is performed at least once. The temporary defect information obtained by using the verify-after-write operation is then temporarily stored in the memory.

When a user presses an eject button (not shown) in order to unload the disc, the controlling unit 1 determines that the recording operation is terminated and reads the temporary defect information stored in the memory, provides the information to the writing/reading unit 2, and causes the information to be recorded on the disc.

The controlling unit 1 comprises a system controller 10, a host I/F 20, a digital signal processor (DSP) 30, RF AMP 40, and a servo 50. During the recording operation, the host I/F 20 receives a predetermined write command from a host 3 (in this embodiment, a computer) and transmits the write command to a system controller 10. The system controller 10 controls the DSP 30 and the servo 50 in order to perform the recording operation in the write command received from the host I/F 20. The DSP 30 adds additional data, such as a parity, to the data to be recorded which is received from the host I/F 20 in order to correct data errors, performs ECC encoding, generates an ECC block, which is an error correcting block, and modulates the ECC block in a predetermined way. The RF AMP 40 changes data outputted from the DSP 30 into RF signals. The writing/reading unit 2 records the RF signals transmitted from the RF AMP 40 on the disc 4. The servo 50 stores recording orders inputted from the system controller 10 and servocontrols the pickup of the writing/reading unit 2.

The system controller 10 includes a defect management unit 11 and a memory unit 12 in order to manage defects. The defect management unit 11 reads temporary defect information stored in the memory unit 12, collects the temporary defect information, and then generates a defect list according to the present invention. That is, when the defect management unit 11 finds information on consecutive defective blocks among the read defect information, the defect management unit 11 generates a consecutive defect list entry comprised of a start entry, corresponding to information on the first defective block of the consecutive defective blocks, and an end entry, corresponding to information on the last defective block of the consecutive defective blocks. Therefore, even if, for example, eight defective blocks occur consecutively, only two entries instead of eight entries are generated, because the entries are generated not for each of the eight blocks but only for the first block and the last block of the eight consecutive defective blocks. Thus, a space required to store the entries can be reduced. The defect management unit 11 also generates a DL entry that includes consecutive defect information, showing whether a defect is a consecutive or a singular defect, and replacement state information, showing whether there is a replacement block or not. The defect management unit 11 generates a DL including such a DL entry.

To reproduce data, the host I/F 20 receives a read command from the host 3. The system controller 10 performs initialization required for reproducing. The writing/reading unit 2 projects a laser beam onto the disc 4, and outputs an optical signal obtained by receiving a laser beam reflected from the disc 4. The RF AMP 40 changes the optical signal outputted from the writing/reading unit 2 into an RF signal, sends modulated data obtained from the RF signal to the DSP 30, and sends a servo control signal obtained from the RF signal to the servo 50. The DSP 30 demodulates the modulated data and performs ECC error correction on the demodulated data. The servo 50 servo controls the pickup after receiving both a servo signal from the RF AMP 40, and an order that is necessary to control a servo received from the system controller 10. The host I/F 20 sends data received from the DSP 30 to the host 3. For controlling the reproduction of data, the system controller 10 controls the servo 50 to read data from the location where the data is recorded.

A structure of an optical disc on which defects are managed according to an embodiment of the present invention is as follows.

Disc management information (DMI) recorded on the optical disc according an embodiment of to the present invention includes a disc definition structure (DDS), recording management data (RMD), and a defect list (DL). A disc management area (DMA) on which DMI is recorded includes a temporary disc management area (TDMA) to record temporary DMI when the disc is recorded, and a finalized disc management area (FDMA) to record finalized DMI.

The TDMA to record the temporary DMI includes a DDS/RMD area to record a DDS and RMD, and a DL area to record a DL.

The DDS includes location information regarding an SA/DL area in which a replacement block, replacing a defective block when a defect occurs in a data block recorded in a data area, and a DL are recorded, location information regarding a DDS/RMD area, location information regarding where the DL is recorded, location information that can be used to replace data in the SA/DL area or to update the DL, a consistency flag to check whether the disc was normally ejected while being used, and write protect information to protect writing.

The RMD, which is information regarding managing data recorded on the disc, includes R-zone entries showing the state of each R-zone in a sequential recording mode, and a bitmap showing as a bit value whether data regarding each recording unit block of a user area is recorded or not for a random recording mode.

The DDS/RMD area, on which the DDS and the RMD are recorded, is arranged in a lead-in area or lead-out area in a single recording layer disc, while the DDS/RMD area is arranged in a lead-in area, middle area, or lead-out area in a double recording layer disc. The DDS/RMD area may be allocated in a part of a data area in order to increase the number of possible updates according to the intention of a drive producer or a user when the disc is initialized for the use of a disc.

When no more data can be recorded on the disc, or the user wants to maintain the current state of the disc without recording additional data and use the disc only for reproducing, the finalization of a disc is performed, and the finalized disc management information is recorded in the FDMA.

A PCA area is arranged for a test to detect the optimum recording power from among various recording powers according to write strategies and the variables according to the write strategies.

Figure 2:
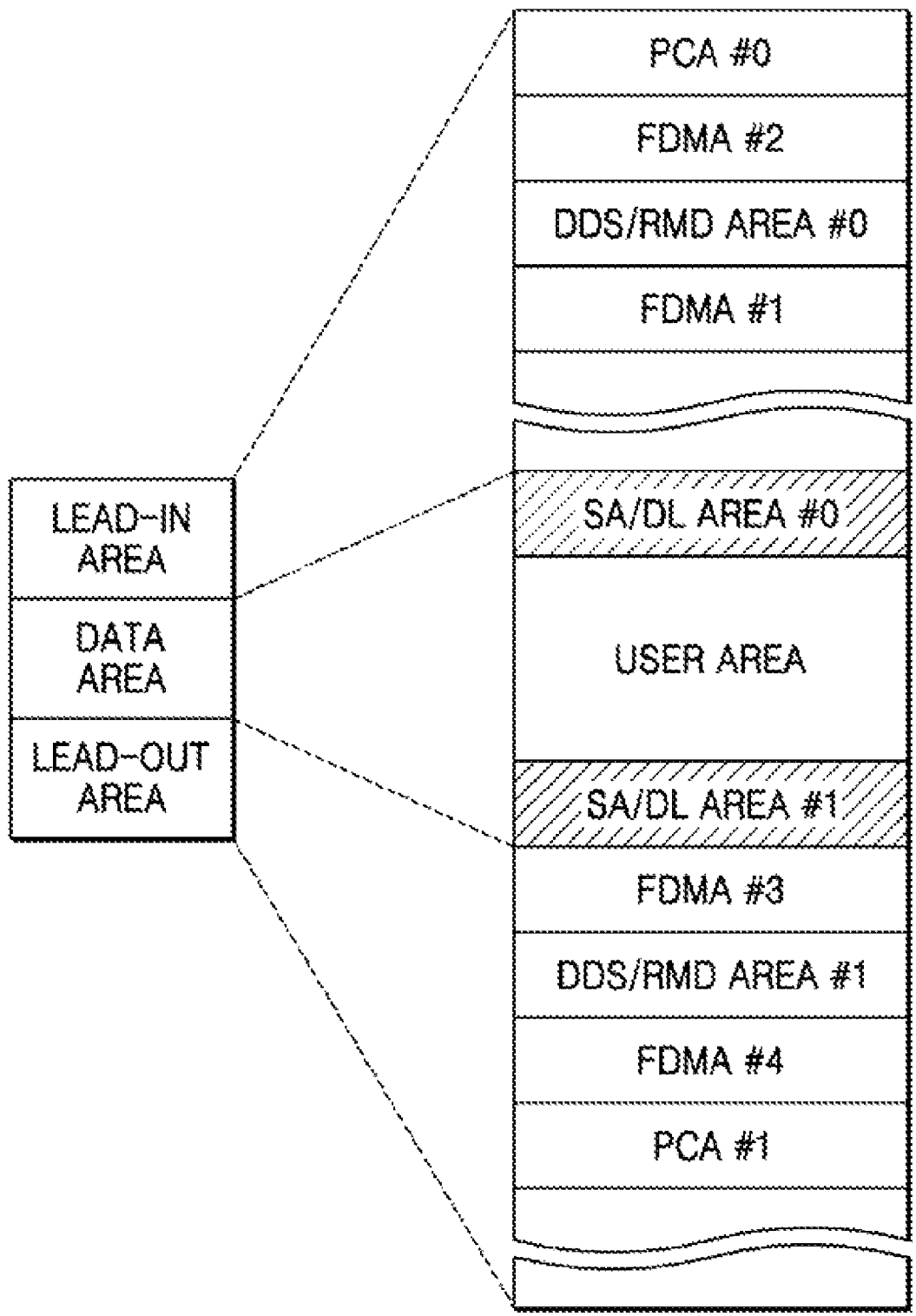
FIG. 2 is a structural diagram of a single recording layer disc according to an embodiment of the present invention.

FIG. 2 is a structural diagram of a single recording layer disc according to an embodiment of the present invention.

Referring to FIG. 2, a lead-out area is formed towards the outer circumference of the disc, a lead-in area is formed towards the center of the disc, and a data area is formed between the lead-out area and lead-in area.

The lead-in area includes a PCA #0, FDMA #1, FDMA #2, and DDS/RMD area #0. The data area includes a user area, SA/DL area #0, and SA/DL area #1. The lead-out area includes a PCA #1, FDMA #3, FDMA #4, and DDS/RMD area #1.

Figure 3:
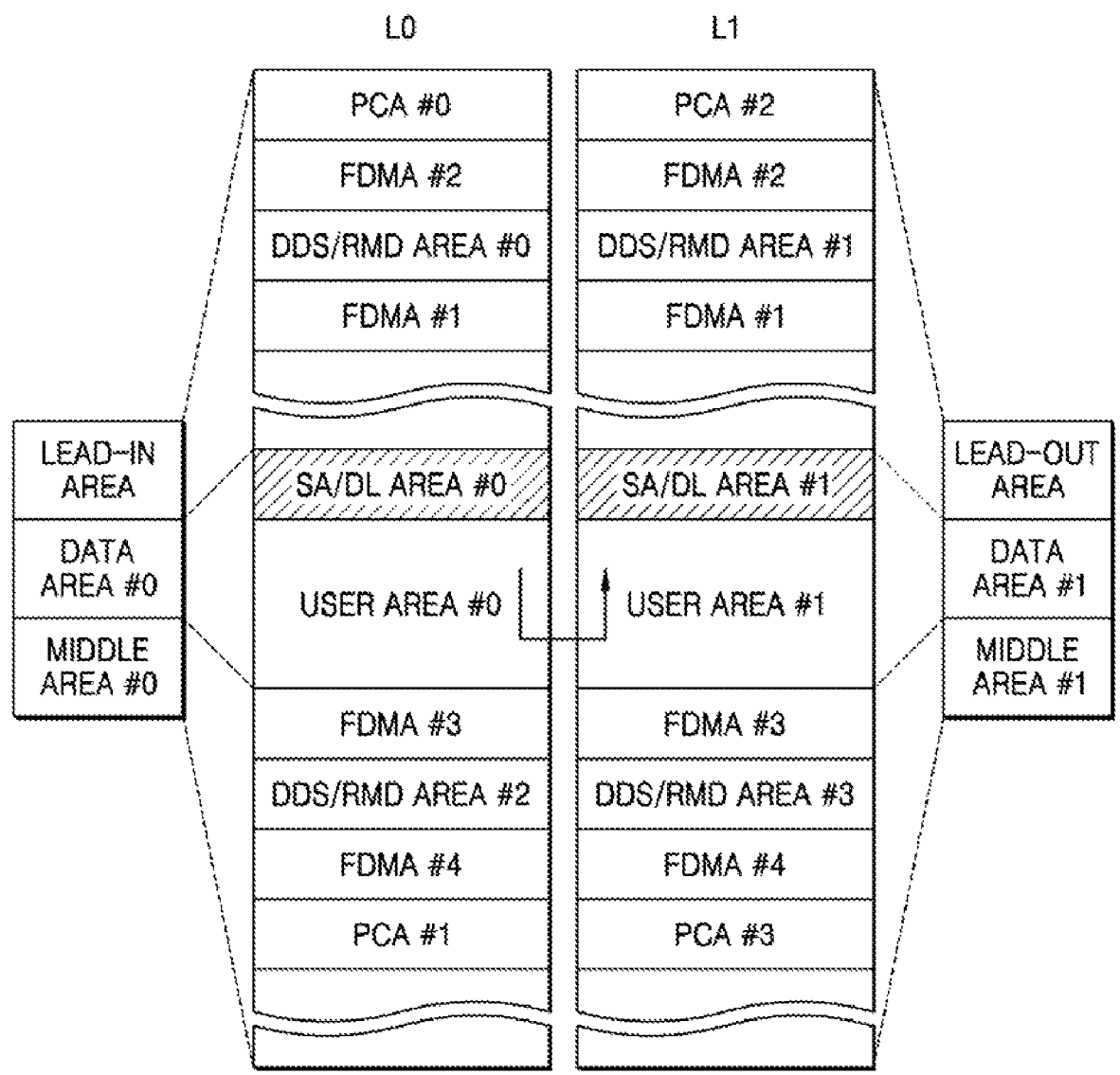
FIG. 3 is a structural diagram of a double recording layer disc according to an embodiment of the present invention.

FIG. 3 is a structural diagram of a double recording layer disc according to an embodiment of the present invention.

Referring to FIG. 3, a lead-in area, data area #0, and middle area #0 are successively arranged in one recording layer L0, while a middle area #1, data area #1, and lead-out area are successively arranged in the other recording area L1.

In the layer L0, the lead-in area includes a PCA #0, FDMA #2, DDS/RMD area #0, and FDMA #1. The data area includes an SA/DL area #0 and user area #0. The middle area #0 includes an FDMA #3, DDS/RMD area #2, FDMA #4, and PCA #1. On the other hand, in the layer L1, the middle area #1 includes an FDMA #3, DDS/RMD area #3, FDMA #4, and PCA #3. The data area #1 includes an SA/DL area #1 and user area #1. The lead-out area includes a PCA #2, FDMA #2, DDS/RMD area #1, and FDMA #1.

As shown in FIGS. 2 and 3, when a defect occurs in the user area, a replacement block replacing a defective block is recorded in the SA/DL area along with information on the defect. The information on the defect includes location information regarding the defective block, location information regarding the replacement block, and information regarding a consecutive defect.

Figure 4:
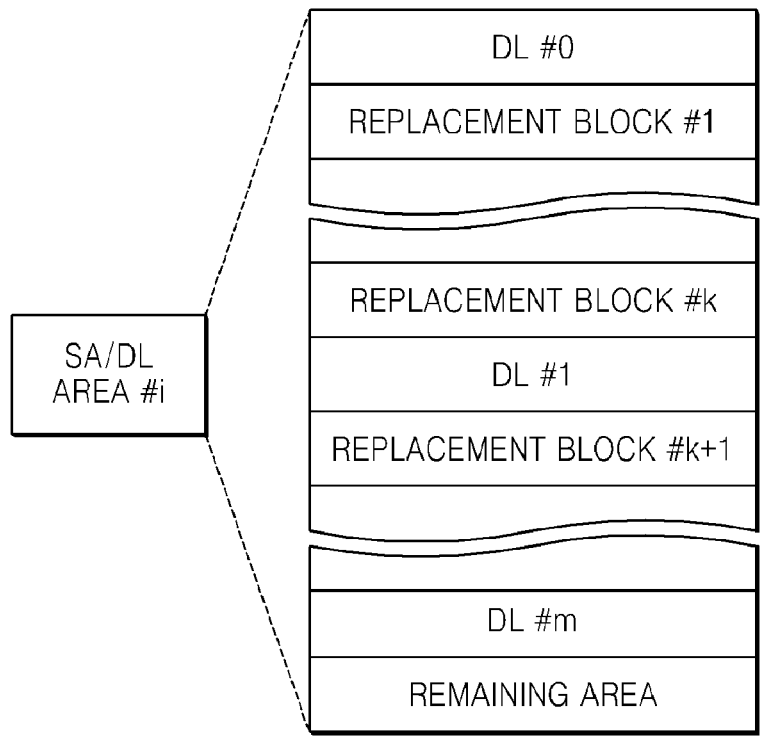
FIG. 4 is a structural diagram of data of a SA/DL area according to an embodiment of the present invention.

FIG. 4 is a structural diagram of data of an SA/DL area according an embodiment of to the present invention.

Referring to FIG. 4, the SA/DL area #i includes a DL #0, replacement block #1, replacement block #k, DL #1, replacement block #k+1, . . . and DL #m.

The DL #0, which is a defect list including information on a defect, includes initialization information.

Replacement blocks, from the replacement block #1 to #k replacing defective blocks from the defective block #1 to #k, are located next to the DL #0. The DL #1, which is a defect list including information regarding defective blocks from the defective block #1 to #k, and regarding replacement blocks from the replacement block #1 to #k, is recorded next to replacement block #14 #k. Replacement blocks from the replacement block #k+1 to #m, replacing defect blocks from the defect block #k+1 to #m, regarding defects occurring in the user area, are located next to the DL #1.

In this manner, a defect list, which includes information regarding a defect according to an embodiment of the present invention, is recorded in the SA/DL area, in which a replacement block replacing a defective block is also located. That is, the defect list and the replacement block are located in one area instead of a separate area.

Figure 5:
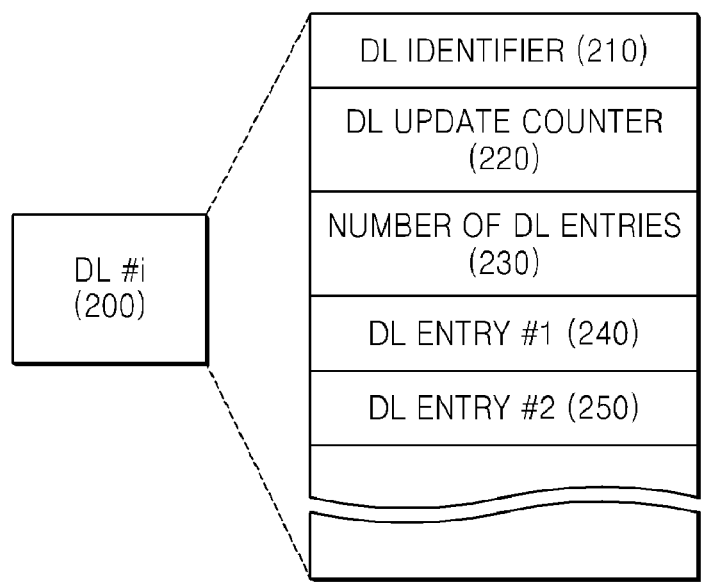
FIG. 5 is a detailed structural diagram of data of DL #i illustrated in FIG. 4.

FIG. 5 is a detailed structural diagram of data of DL #i illustrated in FIG. 4.

Referring to FIG. 5, a DL #i 200 includes a DL identifier 210, DL update counter 220, the number of DL entries 230, DL entry #1 240, and DL entry #2 250.

The DL identifier 210 refers to an identifier indicating a defect list. That is, an identifier indicating a defect list is needed because a defect list and a replacement block are located together in an SA/DL area according to this embodiment of the present invention.

The DL update counter 220 is a value showing the number of updates of a defect list.

The number of DL entries 230 is the total number of entries included in the defect list.

The DL entry #1 240, or DL entry #2 250, is an entry having information on a defect. Examples of contents included in these DL entries are illustrated in FIG. 6.

Figure 6:
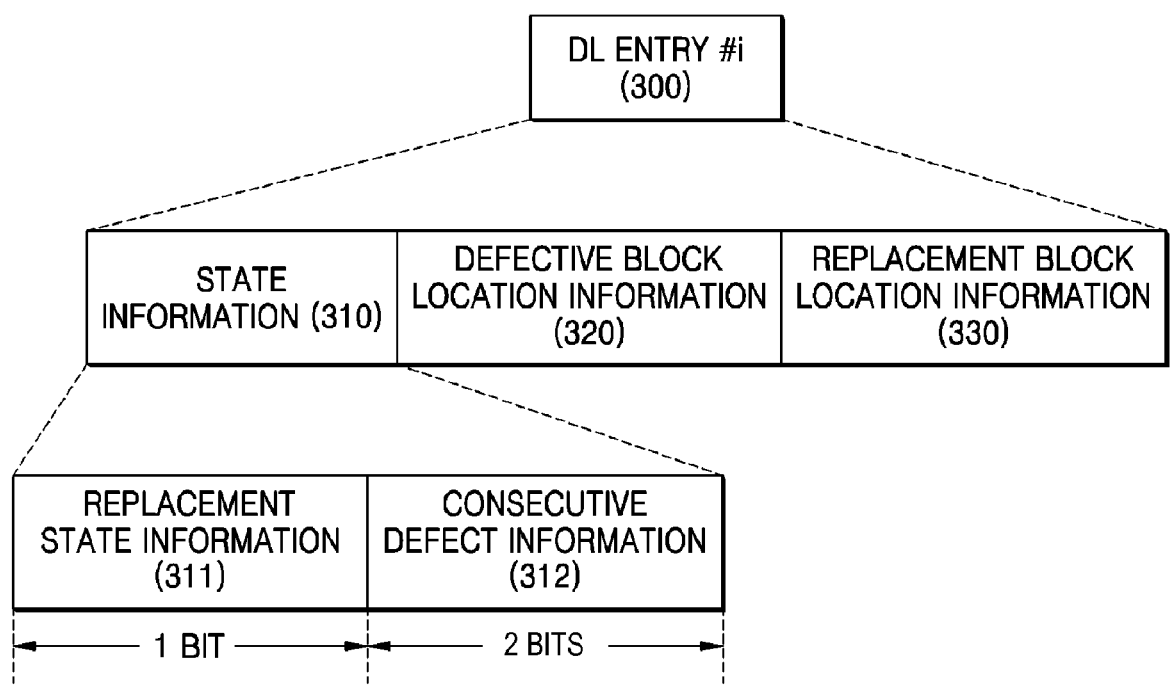
FIG. 6 is a detailed structural diagram of data of a DL entry #i illustrated in FIG. 5.

FIG. 6 is a detailed structural diagram of data of a DL entry #i illustrated in FIG. 5.

Referring to FIG. 6, the DL entry #i 300 includes state information 310, defective block location information 320, and replacement block location information 330.

The state information 310 is state information on a defect represented by a corresponding DL entry. The defective block location information 320 represents location information regarding a defective block recorded on the user area, for example, the sector number of a defective block. The replacement block location information 330 represents location information regarding a replacement block recorded on the SA/DL area, for example, the physical sector number of a replacement block.

The state information 310 includes replacement state information 311, having a length of 1 bit, and consecutive defect information 312, having a length of 2 bits.

The replacement state information 311 represents whether a defective block, which has occurred in the user area, is replaced or not. That is, the information represents whether a defective block in the user area is replaced, and a replacement block exists in the SA/DL area, or the defective block is not replaced, and a replacement block does not exist in the SA/DL area.

The consecutive defect information 312 represents whether the DL entry is a consecutive DL entry, which represents consecutive defective blocks, and whether the DL entry is the beginning or the end of the consecutive DL entry if the DL entry is a consecutive DL entry.

The consecutive defective blocks and consecutive defect list entry are described hereinafter with reference to FIGS. 7 and 8.

Figure 7:
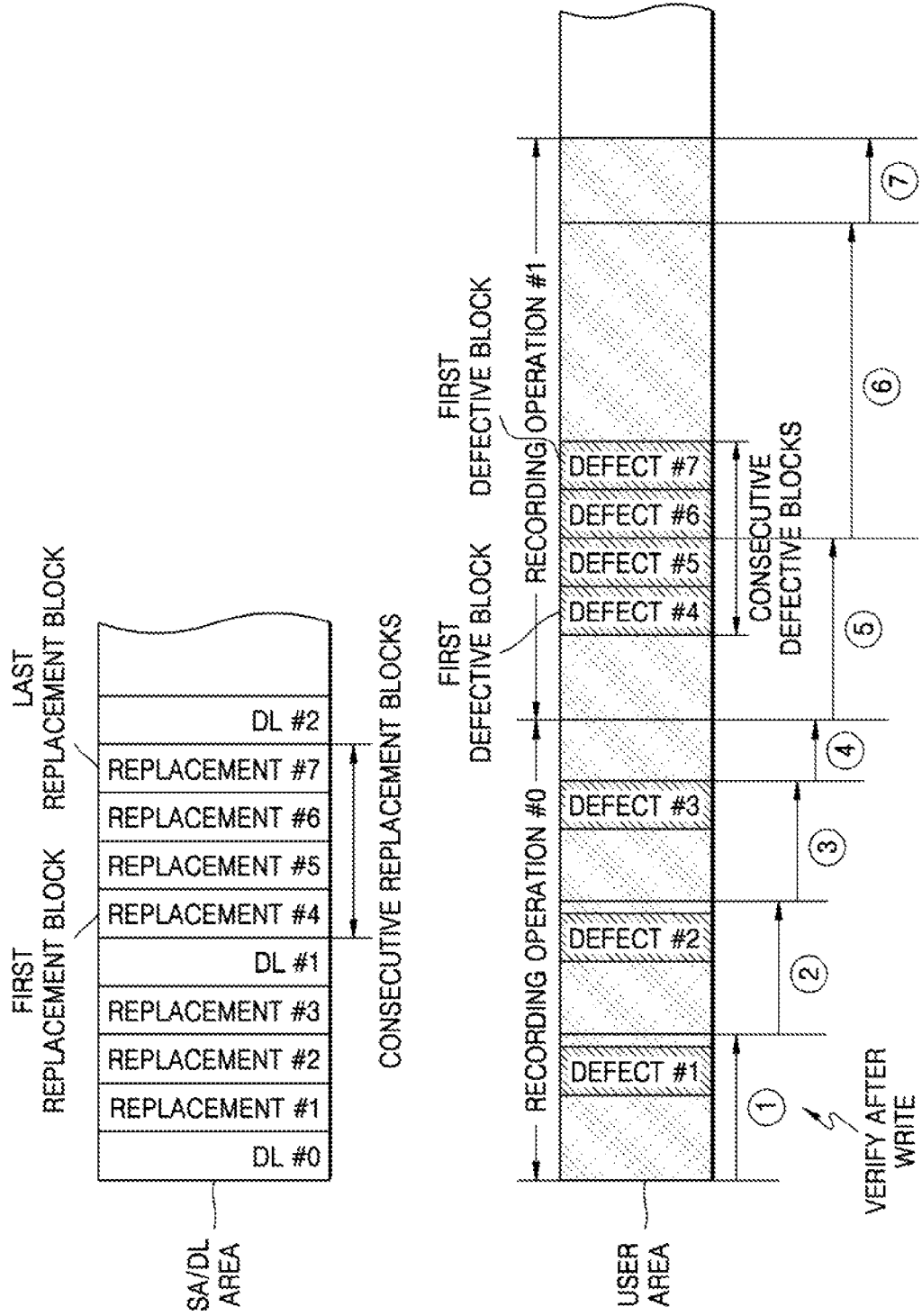
FIG. 7 is a reference diagram illustrating a consecutive defective block according an embodiment of to the present invention.

Referring to FIG. 7, ① through ⑦ refer to units in which a verify-after-write operation is performed. The recording apparatus records user data up to the section ① and then returns to the first part of the section ① in order to check whether the data is properly recorded or a defect has occurred. If a defective part is detected, the part is designated as a defective area. Thus, a defect #1, which is the defective area, is designated. The recording apparatus again records the data recorded in the defect #1 in the SA/DL area. The part in which the data recorded in the defect #1 is recorded again is called a replacement #1. Then, the recording apparatus records user data up to the section ② and then returns to the first part of the section ② in order to check whether the data is properly recorded or a defect is occurred. If a defective part is detected, the part is designated as a defect #2. In the same way, a replacement #2 corresponding to the defect #2 is generated.

In the section ③, a defect #3 and a replacement #3 are generated. Since a defective part is not detected in the section ④, a defective area does not exist in this section.

When termination of a recording operation #0 is predicted after recording and verifying up to the section ④ (when a user pushes an eject button or recording of user data assigned in the recording operation is completed), the recording apparatus records a DL #1, including information regarding defects #1, #2, and #3 that occurred in the sections ① to ④, in the SA/DL area.

During the recording operation #1, the recording device records user data up to the section ⑤ and then returns to the first part of the section ⑤ in order to check whether the data is properly recorded or a defect has occurred. If a defective part is detected, the part is designated as a defect area. In this way, since a defect #4 and a defect #5, which are defect areas, have consecutively occurred, consecutive blocks are designated as defective blocks. The recording device again records data recorded in the defect #4 and the defect #5 in the SA/DL area. Then, the recording apparatus records user data up to the section ⑥, and then returns to the first part of the section ⑥ in order to check whether the data is properly recorded or a defect has occurred. If defect #6 and defect #7, which are defective areas, have consecutively occurred, consecutive blocks are designated as defective blocks. The recording apparatus again records data recorded in the defect #6 and the defect #7 in the SA/DL area. In the section ⑦, no defective part is detected, so a defective area does not exist. When the termination of the recording operation #1 is predicted, the recording apparatus records a DL #2, including information regarding defects #4 through #7, in the SA/DL area.

Defective blocks occurring in consecutive locations of the user area, such as the defects occurring in the recording operation #1, are consecutive defective blocks. The first defective block of the consecutive defective blocks is the defect #4, and the last defective block is the defect #7.

Replacement blocks replacing the consecutive defective blocks that consecutively occurred in predetermined locations of the user area are recorded in consecutive locations of the SA/DL area. As shown in the SA/DL area, a replacement block #4, replacing a defect #4 block, is arranged. In the next location, a replacement #5 block, replacing a defect #5 block, is arranged. In the next location, a replacement block #6, replacing a defect #6 block, is arranged. Then, in the next location, a replacement block #7, replacing a defect #7 block, is arranged. The first replacement block among the replacement blocks replacing consecutive defective blocks is a replacement block #4, and the last replacement block replacing these consecutive defective blocks is a replacement block #7.

When consecutive defective blocks have occurred in consecutive locations, once the location of the first block of the consecutive defective block and the location of the last block are known, the locations of the rest of the blocks included in the consecutive defective block can also be known from the locations of the first and the last blocks, due to the characteristic that defective blocks included in a consecutive defective block are located in consecutive locations. Therefore, a space required to record information regarding defects can be reduced by including only information on the first defective block of a consecutive defective block and the last defective block in information regarding defects. The same is applied to a replacement block replacing a consecutive defective block.

Figures 8, 9:
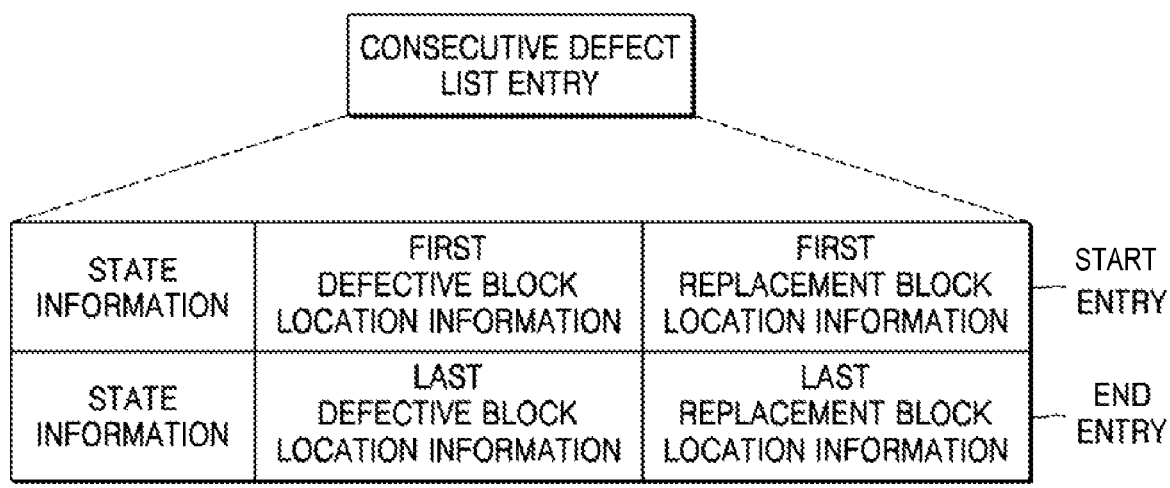
FIG. 8 is a reference diagram illustrating a consecutive defect list according to an embodiment of the present invention.
FIG. 9 is a diagram illustrating an example of the replacement state information and consecutive defect information shown in FIG. 6.

Therefore, a consecutive defect list entry showing information regarding a consecutive defective block may include a start entry and an end entry as shown in FIG. 8.

Referring to FIG. 8, the consecutive defect list entry includes a start entry and an end entry. Both the start entry and the end entry have the same structure as the DL entry shown in FIG. 6. The start entry contains information regarding the first defect among consecutive defects and the end entry contains information regarding the last defect.

The start entry includes state information, first defective block location information representing a location of the user area where the first defective block among the consecutive defective blocks is recorded, and first replacement block location information representing a location of the SA/DL area where the first replacement block replacing the first defective block is recorded. The end entry includes state information, last defective block location information representing a location of the user area where the last defective block among the consecutive defective blocks is recorded, and last replacement block location information representing a location of the SA/DL area where the last replacement block replacing the last defective block is recorded.

FIG. 9 is an example of the replacement state information 311 and consecutive defect information 312 shown in FIG. 6.

Referring to FIG. 9, bits representing the replacement state information 311 are "0" and "1." If the replacement state information 311 is "1," a defective block corresponding to the defective block location information 320 is not replaced, and only a defect location is shown. If the replacement state information 311 is "0," a defective block corresponding to the defective block location information 320 is replaced by a replacement block corresponding to the replacement block location information 330.

Bits representing the consecutive defect information 312 are "00," "01," and "10." If the consecutive defect information 312 is "00," the DL entry refers not to a consecutive defect list entry but to a single defect list entry. In this case, the DL entry may refer to a defective block with a replacement or a defective block without a replacement depending on the value set as the replacement state information. In the case of a defective block with a replacement, the DL entry has defective block location information and replacement block location information. In the case of a defective block without a replacement, the DL entry only has defective block location information.

If the consecutive defect information 312 is "01," the DL entry represents a start entry of a consecutive defect list entry. Therefore, as shown in FIG. 8, the DL entry has first defective block location information regarding consecutive defective blocks, and first replacement block location information regarding consecutive replacement blocks.

If the consecutive defect information 312 is "10," the DL entry represents an end entry of a consecutive defect list entry. Therefore, as shown in FIG. 8, the DL entry has last defective block location information regarding consecutive defective blocks, and last replacement block location information regarding consecutive replacement blocks.

Evaluation of a 3 bit combination of the state information 311, having the length of 1 bit, and the consecutive defect information 312, having the length of 2 bits, is described hereinafter.

If the 3 bit combination is "000," the DL entry represents a single defect list entry about a single defective block, and the state that the single defective block has a replacement block. Therefore, the DL entry has defective block location information and replacement block location information.

If the 3 bit combination is "100," the DL entry represents a single defect list entry about a single defective block, and the state that the single defective block does not have a replacement block. Therefore, the DL entry has defective block location information, but does not have replacement block location information.

If the 3 bit combination is "001," the DL entry represents a start entry of a consecutive defect list entry of consecutive defective blocks, and that a defective block corresponding to the start entry, which is the first defective block among the consecutive defective blocks, has a replacement block. Therefore, the DL entry has location information regarding the first defective block among the consecutive defective blocks, and location information regarding the first replacement block among consecutive replacement blocks replacing the consecutive defective blocks.

If the 3 bit combination is "010," the DL entry represents an end entry of a consecutive defect list entry about consecutive defective blocks, and that a defective block corresponding to the end entry, which is the last defective block from among the consecutive defective blocks, has a replacement block. Therefore, the DL entry has location information regarding the last defective block among the consecutive defective blocks, and location information regarding the last replacement block among consecutive replacement blocks replacing the consecutive defective blocks.

If the 3 bit combination is "101," the DL entry represents a start entry of a consecutive defect list entry about consecutive defective blocks, and that a defective block corresponding to the start entry, which is the first defective block from among the consecutive defective blocks, does not have a replacement block. Therefore, the DL entry has location information regarding the first defective block from among the consecutive defective blocks, but does not have location information regarding a first replacement block from among consecutive replacement blocks replacing the consecutive defective blocks.

If the 3 bit combination is "110," the DL entry represents an end entry of a consecutive defect list entry about consecutive defective blocks, and that a defective block corresponding to the end entry, which is the last defective block from among the consecutive defective blocks, does not have a replacement block. Therefore, the DL entry has location information regarding the last defective block from among the consecutive defective blocks, but does not have location information regarding a last replacement block from among consecutive replacement blocks replacing the consecutive defective blocks.

Figures 10A, 10B:
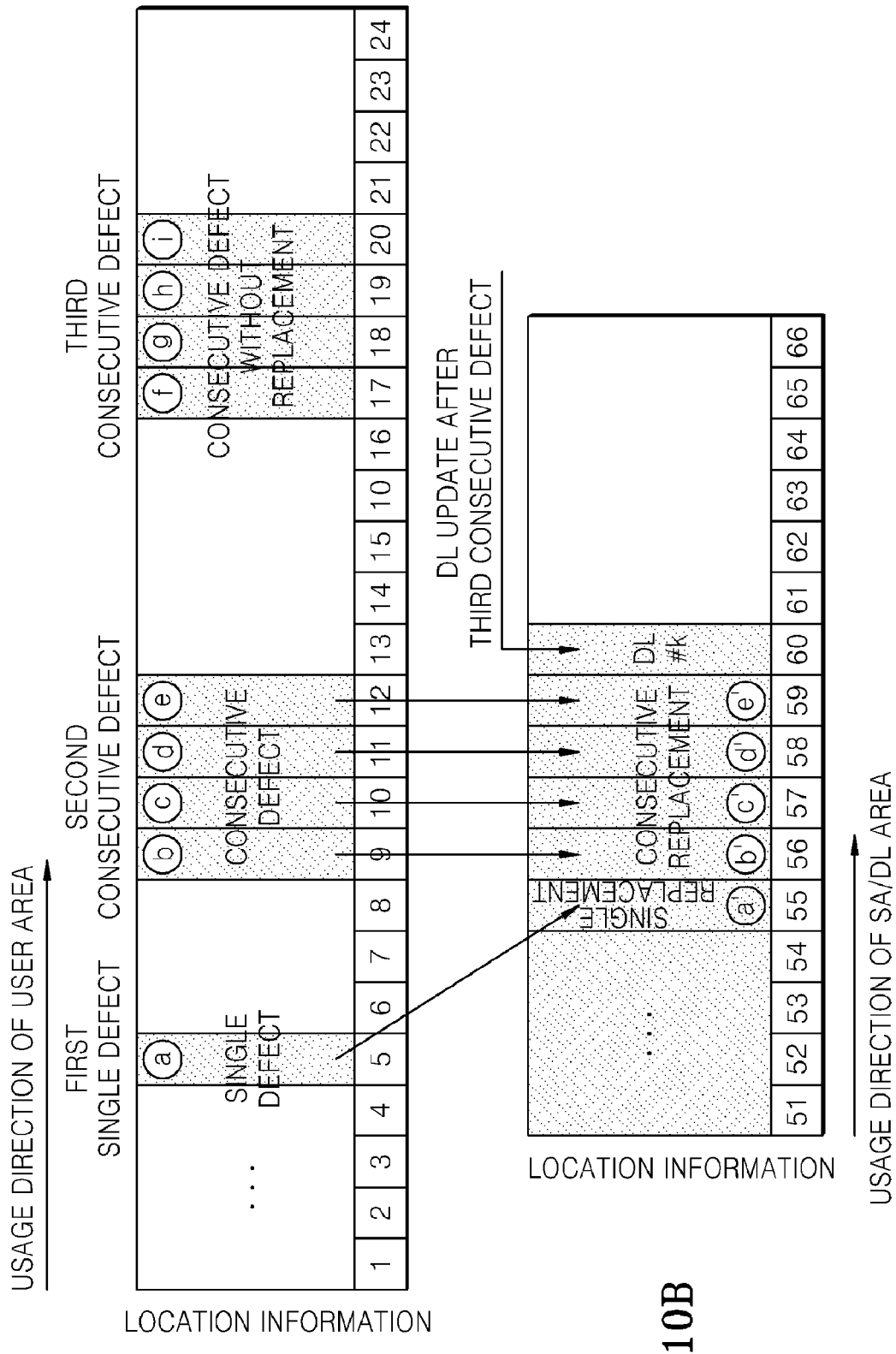
FIGS. 10A and 10B are reference diagrams illustrating a consecutive defect block having a replacement and a consecutive defect block having no replacement according to an embodiment of the present invention.

FIGS. 10A and 10B are reference diagrams illustrating consecutive defect information according an embodiment of to the present invention.

FIG. 10A refers to a user area in which user data is recorded, and FIG. 10B refers to an SA/DL area in which replacement blocks and a defect list are recorded.

Referring to FIG. 10A, a single defective block ⓐ, being the first defect, occurred in the user area location "5." Consecutive defective blocks ⓑ, ⓒ, ⓓ, and ⓔ, being the second defective block, occurred in the consecutive locations "9" to "12." Consecutive defective blocks ⓕ, ⓖ, ⓗ, and ⓘ, being the third defective block, occurred in the consecutive locations "17" to "20."

Referring to FIG. 10B, replacement blocks, which replace defect blocks occurring in the user area, and a defect list are shown in the SA/DL area.

A single replacement block ⓐ', replacing the single defective block ⓐ, is arranged in the location "55" of the SA/DL area. Consecutive replacement blocks ⓑ', ⓒ', ⓓ', and ⓔ', consecutively replacing the consecutive defective blocks ⓑ, ⓒ, ⓓ, and ⓔ, are arranged in the locations of the SA/DL area from "56" to "59." A defect list DL #k, which is updated after the fourth consecutive defect, is recorded at the location "60." The consecutive defective blocks ⓕ, ⓖ, ⓗ, and ⓘ do not have replacement blocks. Information that is included in the defect list DL #k is shown in FIG. 11A.

Figure 11A:
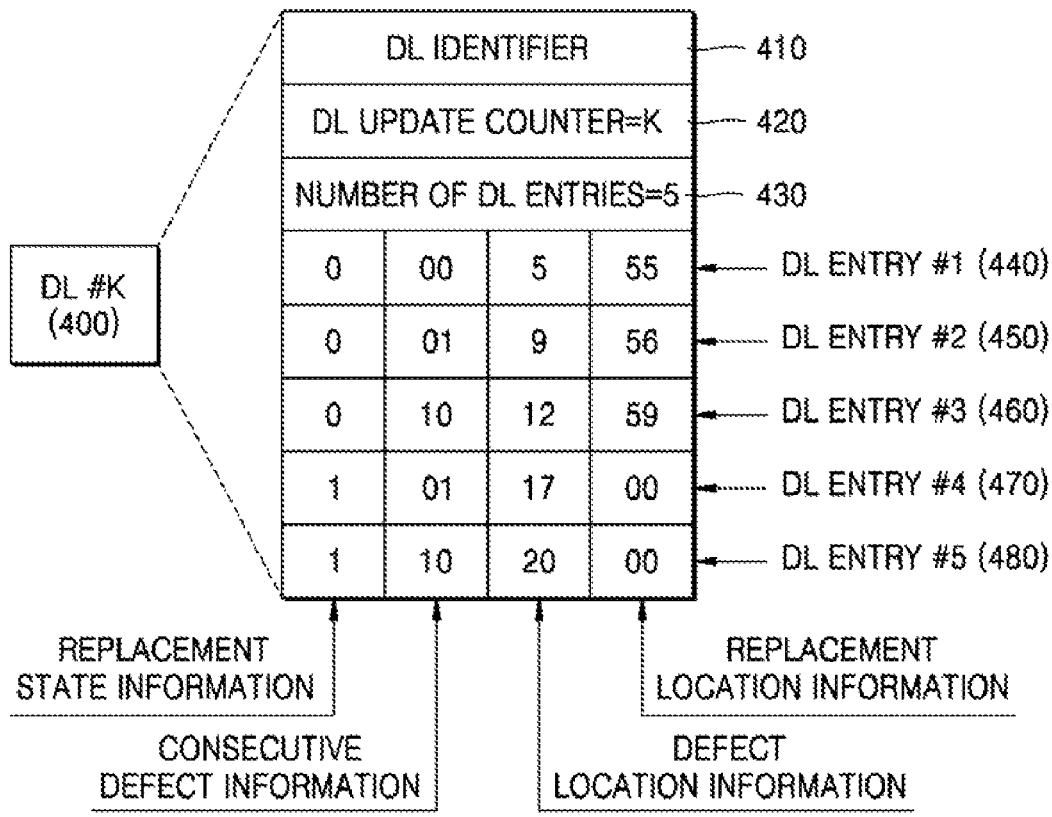
FIG. 11A is a structural diagram of data of a DL #k illustrated in FIG. 10B.

FIG. 11A is a structural diagram of data of the DL #k illustrated in FIG. 10B.

Referring to FIG. 11A, the DL #K 400 includes a DL identifier 410, a DL update counter 420, the number of DL entries 430, and 5 DL entries, that is a DL entry #1 440, DL entry #2 450, DL entry #3 460, DL entry #4 470, and DL entry #5 480.

The DL identifier 410 is an identifier indicating a DL. In the DL update counter 420, "K" is recorded as the number of DL updates. In the number of DL entries 430, "5" is recorded as the total number of entries included in the DL #K.

The DL entry #1 440 is an entry regarding the single defective block ⓐ shown in FIG. 10A. In the DL entry #1 440, "0" is recorded as replacement state information, "00" as consecutive defect information, "5" as defective block location information, and "55" as replacement block location information.

The DL entry #2 450 and the DL entry #3 460 comprise consecutive defect list entries.

The DL entry #2 450 is the start entry of the consecutive defect list entries, and the DL entry #3 460 is the end entry of the consecutive defect list entries. That is, the DL entry #2 450 is an entry regarding the first defective block ⓑ from among the consecutive defective blocks shown in FIG. 10A. In the DL entry #2 450, "0" is recorded as replacement state information because the defective block ⓑ is replaced. "01" is recorded as consecutive defect information because the DL entry #2 450 is the start entry of the consecutive defect list entries. "9" is recorded as location information of the defective block ⓑ, and "56" as location information of the replacement block ⓑ'.

The DL entry #3 460 is an entry regarding the last defective block ⓔ from among the consecutive defective blocks shown in FIG. 10A. In the DL entry #3 460, "0" is recorded as replacement state information, because the defective block ⓔ is replaced. "10" is recorded as consecutive defect information because the DL entry #3 460 is the end entry of the consecutive defect list entries. "12" is recorded as location information of the defective block ⓔ, and "59" as location information of the replacement block ⓔ'.

The DL entry #4 470 and the DL entry #5 480 comprise consecutive defect list entries.

The DL entry #4 470 is the start entry of the consecutive defect list entries, and the DL entry #5 480 is the end entry of the consecutive defect list entries. That is, the DL entry #4 470 is an entry regarding the first defective block ⓕ from among the consecutive defective blocks shown in FIG. 10A. In the DL entry #4 470, "1" is recorded as replacement state information, because the defective block ⓕ is not replaced. "01" is recorded as consecutive defect information, because the DL entry #4 470 is the start entry of the consecutive defect list entries. "17" is recorded as location information of the defective block ⓕ. "00" is recorded as replacement location information, because a replacement block replacing the defective block ⓕ does not exist.

The DL entry #5 480 is an entry regarding the last defective block 0 from among the consecutive defective blocks shown in FIG. 10A. In the DL entry #5 480, "1" is recorded as replacement state information, because the defective block ⓘ is not replaced. "10" is recorded as consecutive defect information, because the DL entry #5 480 is the end entry of the consecutive defect list entries. "20" is recorded as location information of the defective block ⓘ. "00" is recorded as replacement location information, because a replacement block replacing the defective block ⓘ does not exist.

Figure 11B:
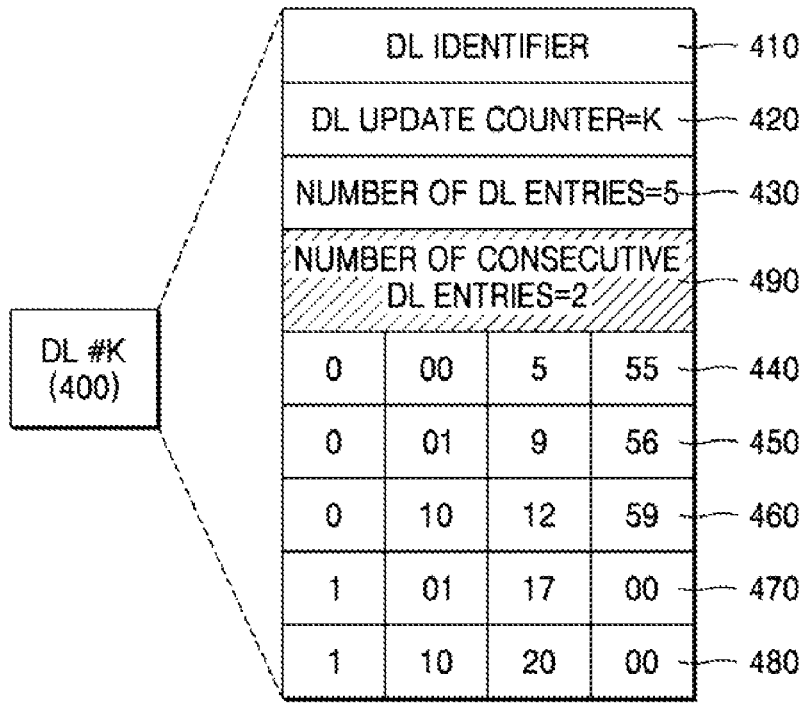
FIG. 11B is a structural diagram of data of a DL #k illustrated in FIG. 10B, further including information on the number of consecutive defect list entries.

FIG. 11B is a structural diagram of a DL #k illustrated in FIG. 10B, further including information regarding the number of consecutive defect list entries.

The DL #k shown in FIG. 11B is similar to the DL #k shown in FIG. 11A, except that the number of consecutive defect list entries 490 is further included. Referring to FIG. 10, "2" is recorded as the number of consecutive defect list entries 490 because there are two consecutive defect list entries.

By including a field for the number of consecutive defect list entries, it is possible to know the number of consecutive defect list entries and the number of single defect list entries in a defect list without searching all the DL entries. The number of single defect list entries may be calculated as shown below from the number of DL entries and the number of consecutive defect list entries.

The number of single defect list entries=the number of DL entries−2× the number of consecutive defect list entries.

Because the consecutive defect list entries are comprised of a pair of a start entry and an end entry, the above expression can be formed.

For example, in the DL #K shown in FIG. 11B, the number of single defect list entries can be calculated as "the number of single defect list entries=5−2×2=1."

FIG. 11C is a structural diagram of data of a DL #k illustrated in FIG. 11B, further including information regarding the number of consecutive defect list entries having replacement state information "0", and information regarding the number of consecutive defect list entries having replacement state information "1".

The DL #k shown in FIG. 11C is similar to the DL #k shown in FIG. 11B, except that information regarding the number of consecutive defect list entries having replacement state information "0" 500, and information on the number of consecutive defect list entries having replacement state information "1" 510, are further included. Referring to FIG. 11C, the consecutive defect list entry having replacement state information "0" is a consecutive defect list entry comprised of DL entry #2 450 and DL entry #3 460. Because the number of the consecutive defect list entries having replacement state information "0" is one, "1" is recorded as the number of consecutive defect list entries having replacement state information "0" 500. The consecutive defect list entry having replacement state information "1" is a consecutive defect list entry comprised of DL entry #4 470 and DL entry #5 480. Because the number of the consecutive defect list entries having replacement state information "1" is one, "1" is recorded as the number of consecutive defect list entries having replacement state information "1" 510.

Figure 12:
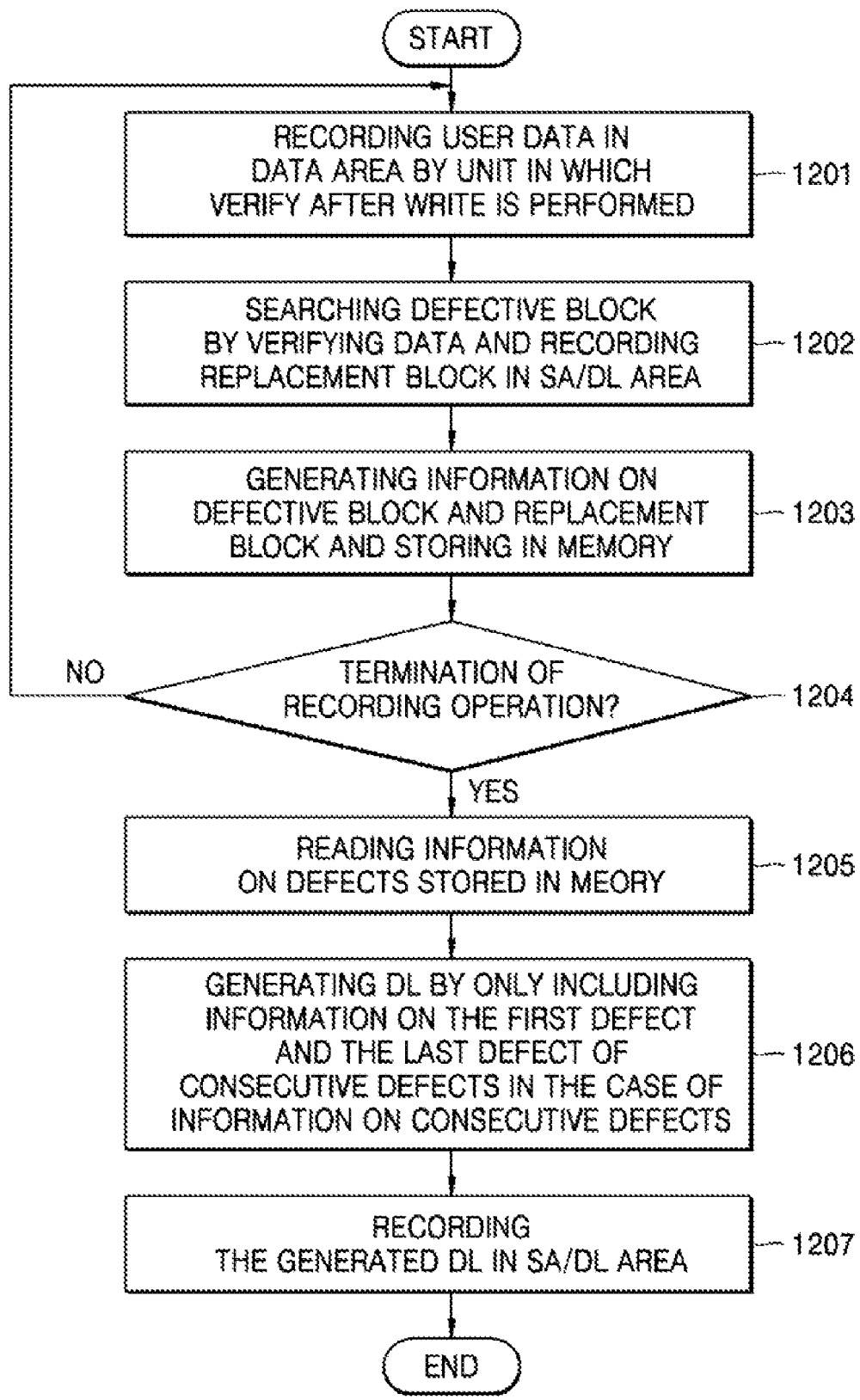
FIG. 12 is a flow chart illustrating a defect management method for an optical disc on which defects area are managed according to an embodiment of the present invention.

FIG. 12 is a flow chart illustrating a defect management method of a disc according to an embodiment of the present invention.

Referring to FIG. 12, the recording apparatus records user data in a data area by a unit in which a verify-after-write operation is performed in operation 1201. Next, data recorded in operation 1201 is verified to find a part in which a defect has occurred in operation 1202. The controlling unit 1 in FIG. 1 designates the part in which a defect occurred as a defective area, records again the data recorded in the defective area in the SA/DL area in order to generate a replacement area, generates information regarding the defective block and the replacement block, and records the information in a memory in operation 1203. The operations 1201 through 1203 are repeated until the termination of the recording operation is predicted in operation 1204.

When recording user data according to a user input, or the recording operation is completed and the termination of the recording operation is predicted in operation 1204, the controlling unit 1 reads information regarding defects stored in the memory in operation 1205.

If information regarding consecutive defects exists among the information on the read defects, a consecutive defect list entry comprising a start entry corresponding to information regarding the first defect of the consecutive defects, and an end entry corresponding to information regarding the last defect, is generated, and a DL is also generated by including consecutive defect information showing whether a defect is a consecutive defect or a single defect, and replacement state information showing whether a replacement block exists in each DL entry in operation 1206.

The generated DL is recorded in the SA/DL area in operation 1207.

The disc defect management method described above may also be realized as a computer readable code stored on a computer-readable recording medium. The computer readable recording medium includes all kinds of recording media on which computer readable data are stored. Examples of the computer readable recording medium include a ROM, a RAM, a CD-ROM, a stereo tape, a floppy disc, and an optical date recording device. The computer readable recording medium may also be a carrier wave (for example, transmission over the Internet). In the computer readable recording media, which are distributed to computer systems connected by network, code that a computer can read by a distribution method can be stored and executed. A function program, code, and code segments for realizing the disc defect management method can be easily inferred by programmers of the technological field to which the present invention belongs.

According to the present invention described above, on an optical disc on which defect management is performed, a space for recording defect lists for defect management can be effectively managed and thus, the entire disc space can be effectively managed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for reproducing data from an optical recording medium, the apparatus comprising:
  a pickup which emits or receives a light to transfer data with respect to the medium comprising a predetermined area to store a replacement block to replace a defective block having a defect in a user data area, and a defect list; and
  a controller which controls the pickup to read the defect list comprising at least one defect list entry, the defect list entry having a first pointer pointing to a physical location of the defective block and a second pointer pointing to a physical location of the replacement block corresponding to the defective block and status information of the defective block and the replacement block, from the predetermined area in the optical recording medium,
  wherein the status information comprises first information indicating whether the defective block is single or consecutive and, if the defective block is consecutive, second information indicating whether the defective block is a start block or an end block among the consecutive defective block, and
  wherein the defect list further comprises information on total number of defect list entries contained in the defect list, and the total number of defect list entries is sum of the number of defect list entries which have the first information indicating that the defective block is consecutive and the second information indicating that the defective block is the start block, and the number of defect list entries which have the first information indicating that the defective block is consecutive and the second information indicating that the defective block is the end block.

2. The apparatus of claim 1, wherein if the defective block is consecutive, the defect list entry consists of a start entry and an end entry, and the start entry includes location information regarding the first defective block, and location information regarding a replacement block replacing the first defective block, and the end entry includes location information regarding the last defective block, and location information regarding a replacement block replacing the last defective block.

3. An apparatus to transfer data with respect to an optical recording medium, the apparatus comprising:
  a pickup to emit or to receive a light to transfer the data with respect to the optical recording medium comprising a predetermined area to store a replacement block, which replaces a defective block having a defect in a user data area; and
  a controlling unit to control the pickup to record a defect list comprising at least one defect list entry, the defect list entry having a first pointer pointing to a physical location of the defective block and a second pointer pointing to a physical location of the replacement block corresponding to the defective block and status information of the defective block and the replacement block, in the predetermined area;
  wherein the status information comprises first information indicating whether the defective block is single or consecutive and, in case of the defective block being consecutive, second information indicating whether the defective block is a start block or an end block among the consecutive defective block, and
  wherein the defect list further comprises information on total number of defect list entries contained in the defect list, and the total number of defect list entries is sum of the number of defect list entries which have the first information indicating that the defective block is consecutive and the second information indicating that the defective block is the start block, and the number of defect list entries which have the first information indicating that the defective block is consecutive and the second information indicating that the defective block is the end block.

4. The apparatus of claim 3, wherein if the defective block is consecutive, the defect list entry consists of a start entry and an end entry, and the start entry includes location information regarding the first defective block, and location information regarding a replacement block replacing the first defective block, and the end entry includes location information regarding the last defective block, and location information regarding a replacement block replacing the last defective block.

5. A method for reproducing data from an optical recording medium comprising a predetermined area to store a replacement block to replace a defective block having a defect in a user data area and a defect list, the method comprising:
  reading the defect list comprising at least one defect list entry, the defect list entry having a first pointer pointing to a physical location of the defective block and a second pointer pointing to a physical location of the replacement block corresponding to the defective block and status information of the defective block and the replacement block, from the predetermined area in the optical recording medium, wherein the status information comprises first information indicating whether the defective block is single or consecutive and, if the defective block is consecutive, second information indicating whether the defective block is a start block or an end block among the consecutive defective block, and wherein the defect list further comprises information on total number of defect list entries contained in the defect list, and the total number of defect list entries is sum of the number of defect list entries which have the first information indicating that the defective block is consecutive and the second information indicating that the defective block is the start block, and the number of defect list entries which have the first information indicating that the defective block is consecutive and the second information indicating that the defective block is the end block.

6. The apparatus of claim 5, wherein if the defective block is consecutive, the defect list entry consists of a start entry and an end entry, and the start entry includes location information regarding the first defective block, and location information regarding a replacement block replacing the first defective block, and the end entry includes location information regarding the last defective block, and location information regarding a replacement block replacing the last defective block.

7. A method to transfer data with respect to an optical recording medium comprising a predetermined area to store a replacement block, which replaces a defective block having a defect in a user data area, the method comprising:

recording a defect list comprising at least one defect list entry, the defect list entry having a first pointer pointing to a physical location of the defective block and a second pointer pointing to a physical location of the replacement block corresponding to the defective block and status information of the defective block and the replacement block, in the predetermined area, wherein the status information comprises first information indicating whether the defective block is single or consecutive and, if the defective block is consecutive, second information indicating whether the defective block is a start block or an end block among the consecutive defective block, and wherein the defect list further comprises information on total number of defect list entries contained in the defect list, and the total number of defect list entries is sum of the number of defect list entries which have the first information indicating that the defective block is consecutive and the second information indicating that the defective block is the start block, and the number of defect list entries which have the first information indicating that the defective block is consecutive and the second information indicating that the defective block is the end block.

8. The method of claim 7, wherein if the defective block is consecutive, the defect list entry consists of a start entry and an end entry, and the start entry includes location information regarding the first defective block, and location information regarding a replacement block replacing the first defective block, and the end entry includes location information regarding the last defective block, and location information regarding a replacement block replacing the last defective block.

9. An optical recording medium comprising:

a user data area; and a predetermined area to store a replacement block to replace a defective block located in the user data area, and a defect list comprising at least one of defect list entry, the defect list entry having a first pointer pointing to a physical location of the defective block and a second pointer pointing to a physical location of the replacement block corresponding to the defective block and status information of the defective block and the replacement block, wherein the status information comprises first information indicating whether the defective block is single or consecutive and, if the defective block is consecutive, second information indicating whether the defective block is a start block or an end block among the consecutive defective block, and wherein the defect list further comprises information on total number of defect list entries contained in the defect list, and the total number of defect list entries is sum of the number of defect list entries which have the first information indicating that the defective block is consecutive and the second information indicating that the defective block is the start block, and the number of defect list entries which have the first information indicating that the defective block is consecutive and the second information indicating that the defective block is the end block.

10. The optical recording medium of claim 9, wherein if the defective block is consecutive, the defect list entry consists of a start entry and an end entry, and the start entry includes location information regarding the first defective block, and location information regarding a replacement block replacing the first defective block, and the end entry includes location information regarding the last defective block, and location information regarding a replacement block replacing the last defective block.

11. The apparatus of claim 1, wherein the status information further comprises information indicating whether the defective block is replaced by the replacement block.

12. The apparatus of claim 3, wherein the status information further comprises information indicating whether the defective block is replaced by the replacement block.

13. The method of claim 5, wherein the status information further comprises information indicating whether the defective block is replaced by the replacement block.

14. The method of claim 7, wherein the status information further comprises information indicating whether the defective block is replaced by the replacement block.

15. The medium of claim 9, wherein the status information further comprises information indicating whether the defective block is replaced by the replacement block.

* * * * *

UNITED STATES PATENT AND TRADEMARK OFFICE
CERTIFICATE OF CORRECTION

PATENT NO. : 7,869,319 B2
APPLICATION NO. : 11/967555
DATED : January 11, 2011
INVENTOR(S) : Sung-hee Hwang et al.

It is certified that error appears in the above-identified patent and that said Letters Patent is hereby corrected as shown below:

Delete the two paragraphs in column 13, line 62, through column 14, line 11 (claim 1, lines 16-32) and insert the following three paragraphs in their place:

--wherein the status information comprises first information indicating whether the defective block is single or consecutive and, if the defective block is consecutive, second information indicating whether the defective block is a start block or an end block of consecutive defective blocks;
    the defect list further comprises information on a total number of defect list entries contained in the defect list; and
    the total number of defect list entries comprises a total number of defect list entries having the first information indicating that the defective block is consecutive and the second information indicating that the defective block is the start block, and a total number of defect list entries having the first information indicating that the defective block is consecutive and the second information indicating that the defective block is the end block.--

Delete the two paragraphs in column 14, lines 35-51 (claim 3, lines 16-32) and insert the following three paragraphs in their place:

--wherein the status information comprises first information indicating whether the defective block is single or consecutive and, if the defective block is consecutive, second information indicating whether the defective block is a start block or an end block of consecutive defective blocks;
    the defect list further comprises information on a total number of defect list entries contained in the defect list; and
    the total number of defect list entries comprises a total number of defect list entries having the first information indicating that the defective block is consecutive and the second information indicating that the defective block is the start block, and a total number of defect list entries having the first information indicating that the defective block is consecutive and the second information indicating that the defective block is the end block.--

Signed and Sealed this
Thirteenth Day of March, 2012

David J. Kappos
*Director of the United States Patent and Trademark Office*

CERTIFICATE OF CORRECTION (continued)
U.S. Pat. No. 7,869,319 B2

Delete the two paragraphs in column 15, lines 5-21 (claim 5, lines 13-29) and insert the following three paragraphs in their place:

--wherein the status information comprises first information indicating whether the defective block is single or consecutive and, if the defective block is consecutive, second information indicating whether the defective block is a start block or an end block of consecutive defective blocks;

the defect list further comprises information on a total number of defect list entries contained in the defect list; and the total number of defect list entries comprises a total number of defect list entries having the first information indicating that the defective block is consecutive and the second information indicating that the defective block is the start block, and a total number of defect list entries having the first information indicating that the defective block is consecutive and the second information indicating that the defective block is the end block.--

Delete the two paragraphs in column 15, lines 41-57 (claim 7, lines 12-28) and insert the following three paragraphs in their place:

--wherein the status information comprises first information indicating whether the defective block is single or consecutive and, if the defective block is consecutive, second information indicating whether the defective block is a start block or an end block of consecutive defective blocks;

the defect list further comprises information on a total number of defect list entries contained in the defect list; and the total number of defect list entries comprises a total number of defect list entries having the first information indicating that the defective block is consecutive and the second information indicating that the defective block is the start block, and a total number of defect list entries having the first information indicating that the defective block is consecutive and the second information indicating that the defective block is the end block.--

Delete the two paragraphs in column 16, lines 18-34 (claim 9, lines 12-28) and insert the following three paragraphs in their place:

--wherein the status information comprises first information indicating whether the defective block is single or consecutive and, if the defective block is consecutive, second information indicating whether the defective block is a start block or an end block of consecutive defective blocks;

the defect list further comprises information on a total number of defect list entries contained in the defect list; and the total number of defect list entries comprises a total number of defect list entries having the first information indicating that the defective block is consecutive and the second information indicating that the defective block is the start block, and a total number of defect list entries having the first information indicating that the defective block is consecutive and the second information indicating that the defective block is the end block.--